United States Patent Office 3,716,535
Patented Feb. 13, 1973

3,716,535
TRIMERIZATION OF ISOCYANATES
Kenneth H. Markiewitz, Wilmington, Del., assignor to ICI America Inc.
No Drawing. Filed Feb. 27, 1968, Ser. No. 708,484
Int. Cl. C07d 55/38
U.S. Cl. 260—248 NS 9 Claims

ABSTRACT OF THE DISCLOSURE

Aromatic isocyanates are trimerized with a catalyst system which comprises a mixture of at least one tertiary amine and at least one co-catalyst selected from the group consisting of benzoyl peroxide and compounds having the formula

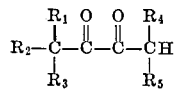

wherein $R_1$ and $R_4$ are independently selected from the group consisting of hydrogen, alkyl groups having from 1 to 4 carbon atoms, and aryl groups, $R_2$, $R_3$, and $R_5$ are independently selected from the group consisting of hydrogen and alkyl groups having from 1 to 4 carbon atoms, and the total number of carbon atoms in the alkyl group is from 1 to 10. The reaction is divided into two stages. The first stage is an initiation period during which substantially no polymerization occurs. The second stage is the rapid trimerization of the isocyanate.

---

This invention relates to the trimerization of aromatic isocyanates. More particularly, this invention relates to an improved catalytic system for trimerizing aromatic isocyanates.

The catalytic activity of tertiary amines in effecting the trimerization of aromatic isocyanates is well known in the isocyanate art. The reaction is slow, requires high temperatures and long reaction times, and results in very low yields of trimerized isocyanate. Catalysts for the rapid trimerization of isocyanates are also known. Among these catalysts are organic bases containing a hydroxyl ion, such as benzyltrimethyl ammonium hydroxide. The disadvantage of these rapid trimerization catalysts is that the reaction goes so rapidly that there is not sufficient time for proper stirring or handling of the reaction mixture.

A catalysts system for trimerizing aromatic isocyanates has now been found, in accordance with this invention, which overcomes the aforesaid disadvantages. The trimerization of aromatic isocyanates with the catalyst systems of this invention is divided into two stages. The first stage is an initiation period during which substantially no trimerizaton takes place. During this initiaton period, the reaction mixture can be stirred to insure uniform distribution of the catalyst throughout the reaction mixture or handled in any desired manner, such as pouring into a mold, etc., without any danger of trimerization occurring. The second stage of the reaction is the rapid trimerization of aromatic isocyanate, without the addition of external heat, to high yields of trimerized isocyanate.

The catalyst systems of this invention comprise a mixture of at least one tertiary amine and at least one co-catalyst selected from the group consisting of benzoyl peroxide and compounds having the formula

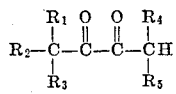

where $R_1$ and $R_4$ are independently selected from the group consisting of hydrogen, alkyl groups having from 1 to 4 carbon atoms, and aryl groups, $R_2$, $R_3$ and $R_5$ are independently selected from the group consisting of hydrogen and alkyl groups having from 1 to 4 carbon atoms, and the total number of carbon atoms in the alkyl groups is from 1 to 10.

The reason for the initiation period and the specific contribution that the co-catalyst makes to the reaction are not known. However, it has been found that, after a short initiation period, aromatic isocyanates are rapidly trimerized by a combination of tertiary amines and co-catalyst, whereas aromatic isocyanates trimerize only very slowly with tertiary amines and aromatic isocyanates are essentially unreactive with the co-catalyst.

The tertiary amines used in formulating the catalyst systems of this invention may be any tertiary amines which exerts a catalytic effect on the trimerization of aromatic isocyanates. These tertiary amines are well-known in the art and include, for example, pyridine, triethylamine trimethyl amine, tripropylamine, dimethyl aniline, hexahydrodimethyl aniline, triethylene tetramine, diethylcyclohexylamine, N.N,diethylethanolamine, and 1,4-diazabicyclo-(2,2,2)-octane.

Examples of co-catalyst which may be used include, for example, benzoyl peroxide, 2,3-butanedione, 2,3-pentanedione, 2-methyl-3,4-pentanedione, 3,4-hexanedione, 3,4-heptanedione, 2-methyl-3,4-octanedione, 4,5-nonanedione, 2,2-dimethyl-3,4-pentanedione, 3,6-diethyl-4,5 - decanedione, 1-phenyl-2,3-butanedione, 1-phenyl-2,3-pentanedione, 1,4-diphenyl-2,3-butanedione, 1,4 - diphenyl-1-methyl-2,3-butanedione, and the like. The preferred co-catalyst is 2,3-butanedione.

Any aromatic isocyanate, that is any isocyanate containing at least one isocyanate group directly bonded to a carbon atom of an aromatic ring, may be trimerized with the catalyst systems of this invention. Illustrative examples of aromatic isocyanates which may be trimerized with the catalyst systems of this invention are phenyl isocyanate; p-chlorophenyl isocyanate; p-nitrophenyl isocyanate; 2-naphthyl isocyanate; tolylene diisocyanate; o-methoxyphenyl isocyanate; p-phenylene diisocyanate; 1-methoxy-phenylene 2,4 diisocyanate; diphenylene 4,4-diisocyanate; toluene 2,4,6-triisocyanate; m-tolyl isocyanate; 4-cyclohexyl-phenyl isocyanate; diphenylmethane 4-isocyanate; 3-cyanophenyl isocyanate; 4-chloro-3-(trifluoromethyl)-phenyl isocyanate; 4-ethoxyphenyl isocyanate; 4-(O,O-diethyl dithiophosphoryl)-phenyl isocyanate; 1-ethylbenzene 2,4-diisocyanate; triphenylmethane 4,4',4"-triisocyanate; and diphenylmethane diisocyanate. The aromatic isocyanate may also be an aromatic isocyanate terminated polymer, for example polyurethane.

Aromatic isocyanate terminated polyurethanes may be prepared by any of the conventional methods known in the prior art, see for instance Kirk-Othmer, "The Encyclopedia of Chemical Technology," first supplement, pages 888, et. seq. (Interscience, 1957). Briefly, this process involves the reaction of an aromatic diisocyanate or aromatic polyisocyanate, in excess of the stoichiometric quantity, with a compound containing at least two active hydrogens. The reaction may be carried out according to the well-known "one-shot" or "prepolymer" methods. The most common active hydrogen containing compounds which are employed are the polyhydric alcohols, polyethers, and polyesters.

Illustrative polyhydric alcohols include ethylene glycol, glycerine, pentaerythritol, hexanetriols, sorbitol, methyl glucosides, isosorbide, xyloside, glucose, sucrose, lactositol, tetra-pentaerythritol, resorcinol, 6,7-dihydroxy-1-naphthol, and 2,2-bis(4-hydroxyphenyl) propane.

Illustrative polyethers include the polyoxyalkylene ether polyols which are prepared by the reaction of alkylene oxides, for example, ethylene oxide, propylene oxide, and butylene oxide, with polyhydric alcohols, for example, ethylene glycol, glycerine, pentaerythritol, hexanetriol, sorbitol, methyl glucoside, isosorbide, xyloside, glucose, sucrose, lactositol, tetra-pentaerythritol, resorcinol, 6,7-dihydroxy-1-naphthol, and 2,2-bis(4-hydroxyphenyl) propane. Additional polyethers which may be used in the preparation of the polyurethanes of this invention are disclosed in U.S. Pat. No. 3,159,591, the disclosure of which is hereby incorporated into this application by reference.

Illustrative polyesters include the polyesters which are prepared by reacting a polycarboxylic acid, for example, adipic acid, sebacic acid, phthalic acid, maleic acid, and fumaric acid, with a polyhydric alcohol, for example, ethylene glycol, trimethylol propane, glycerine, pentaerythritol, and polyoxypropylene (2.2) 2,2-bis(4-hydroxyphenyl) propane.

The polymerization of aromatic isocyanates with the catalyst systems of this invention may be carried out by merely contacting or mixing the aromatic isocyanate with the catalyst mixture. The tertiary amine and co-catalyst may be mixed together and then contacted with the aromatic isocyanate, or the tertiary amine and co-catalyst may be added separately to the aromatic isocyanate.

The catalyst mixture of this invention may be contacted with the aromatic isocyanate at temperatures from $-10°$ C. to the temperature at which the particular catalyst mixture used decomposes, but it is usually preferable to contact the catalyst mixture with the aromatic isocyanate at or about room temperature. If desired, solvents which are inert to the aromatic isocyanate may be present. Suitable solvents include esters such as ethyl acetate and butyl acetate, ketones such as acetone and methyl ethyl ketone, chloroform, benzene, toluene, xylene, chlorobenzene, and ethers such as diethyl ether, dibutyl ether, petroleum ethers, and dimethyl ether of diethylene glycol.

The amounts of tertiary amine and co-catalyst which may be used in accordance with the process of this invention are not critical and may vary over a wide range. In general, the aromatic isocyanate is desirably contacted with from about 0.1% to about 10%, by weight of aromatic isocyanate, of a catalytic mixture comprising from about 10 to about 90 parts by weight of tertiary amine and from about 90 parts to about 10 parts by weight of co-catalyst. Smaller amounts of tertiary amine and co-catalyst result in rather long initiation periods and slow reaction, and larger amounts of tertiary amine and co-catalyst serve no beneficial purpose and would appear to be uneconomical. However, it is understood that smaller and larger amounts of tertiary amine and co-catalyst may be used, if desired.

Trimerized aromatic isocyanates have a variety of applications: as adhesives, as curing agents for resins, as components of or as curing agents for isocyanate modified polyesters or polyether raw rubbers, or as isocyanates for producing both elastic and rigid cellular materials. Polyurethane foams prepared with the trimerized aromatic isocyanates show less discoloration on aging. The toxic hazard of volatile diisocyanates and polyisocyanates can be virtually overcome by the use of the trimers thereof. This is of particular value when isocyanates are used in conditions of poor ventilation.

The invention will be more readily understood from a consideration of the following examples which are presented for illustrative purposes and are not to be construed as limiting the invention.

The following procedure is employed in Examples 1 to 15. Into a three-necked pear shaped 50 ml. flask, stirred magnetically, insulated with glass wool, and equipped with a recording thermocouple, are placed 11.9 grams of the isocyanate, 13.1 grams of the solvent, and the indicated amounts of the tertiary amine and co-catalyst. No external heat is applied. The reaction mixture remains at room temperature for a short period of time and then an exothermic reaction occurs. The temperature rapidly reaches a maximum, levels off, and then decreases. The period from the addition of all the reactants to the flask until the temperature in the flask starts to rise is called the "initiation period." The period from when the temperature in the flask starts to rise until maximum temperature is reached is called the "time to reach maximum temperature." The time required to reach maximum temperature is a direct expression of the reaction rate.

| Example number | Tertiary amine | Grams of tertiary amine | Co-catalyst | Grams of co-catalyst | Isocyanate | Solvent | Initiation period, minutes | Time to reach maximum temperature, minutes |
|---|---|---|---|---|---|---|---|---|
| 1 | DABCO [1] | 0.952 | 2,3-butanedione | 0.952 | Phenylisocyanate | Chlorobenzene | 1.6 | 1 |
| 2 | do | 0.476 | do | 0.476 | do | do | 4.4 | 1 |
| 3 | do | 0.476 | do | 0.119 | do | do | 8.1 | 1.9 |
| 4 | do | 0.238 | do | 0.714 | do | do | 6.3 | 1.3 |
| 5 | do | 0.238 | do | 0.476 | do | do | 8.3 | 1.3 |
| 6 | do | 0.238 | do | 0.119 | do | do | 29.4 | 1.9 |
| 7 | do | 0.119 | do | 0.476 | do | do | 28.8 | 1.6 |
| 8 | do | 0.119 | do | 0.119 | do | do | 16.2 | 4 |
| 9 | do | 0.059 | do | 0.238 | do | do | 37.5 | 2.25 |
| 10 | Trimethylamine | 0.476 | do | 0.476 | do | do | 15 | 1.87 |
| 11 | Triethylamine | 0.238 | do | 0.476 | do | do | 44.5 | 1.87 |
| 12 | DABCO [1] | 0.476 | do | 0.119 | do | Dimethylether of diethylene glycol | 4.5 | 1.25 |
| 13 | do | 0.119 | do | 0.476 | do | Acetonitrile | 2.6 | 0.9 |
| 14 | do | 0.476 | Benzol peroxide | 0.119 | do | Chlorobenzene | 17.8 | 1.9 |
| 15 | do | 0.119 | 2,3-butanedione | 0.476 | Tolylene diisocyanate | do | 11.9 | 3.4 |

[1] 1,4-diazabicyclo-(2,2,2)-octane.

EXAMPLE 16

Five grams of an isocyanate terminated prepolymer based on tolylene diisocyanate and polyoxypropylene ether of sorbitol (3.5 free isocyanate groups per molecule and equivalent weight of 156) are mixed with 0.1 gram of 1,4 - diazabicyclo - (2,2,3)-octane, 0.5 ml. chlorobenzene, and 0.2 gram of 2,3-butanedione. The mixture is stirred and poured on a glass plate which is heated at 50° C. for ten minutes. An odorless, hard, clear coating is formed.

EXAMPLE 17

A large cardboard container is charged with 4.65 grams of polyoxypropylene(10)sorbitol, 3.55 grams of tolylene diisocyanate, 1.7 grams of Freon–11, 0.04 gram of 1,4-diazabicyclo-(2,2,2)-octane, and 0.05 grams of 2,3-butanedione. A strong rigid foam formed rapidly.

EXAMPLE 18

Five grams of the isocyanate terminated prepolymer described in Example 16 is mixed with 0.1 gram of 1,4-diazabicyclo-(2,2,2)-octane, and 0.2 gram of 2,3-butanedione and poured into a mold. The mixture is heated at 50° C. for several hours to form a hard, non-brittle, amber casting.

EXAMPLE 19

100 grams of diphenylene-4,4-diisocyanate is mixed with 0.5 grams of dimethyl aniline and 0.5 gram of 1,4- diphenyl-2,3-butanedione, and the resulting mixture is added to a one-liter flask. After a short initiation period, the rapid trimerization of the isocyanate occurs.

EXAMPLE 20

Ten grams of 4-chloro-3-(trifluoromethyl)-phenyl isocyanate and 0.1 gram of triethylene tetramine are added to a 50 ml. insulated flask equipped with a recording thermocouple. The mixture is stirred for four hours during which time no reaction or increase in temperature is observed. 0.1 gram of 3,6-diethyl-4,5-decanedione is then added. The temperature in the flask remains at room temperature for a brief time and then the temperature increases rapidly. The reaction product is the trimer of 4-chloro-3-(trifluoromethyl)-phenyl isocyanate.

EXAMPLE 21

Five grams of an isocyanate terminated polyester prepolymer, prepared from tolylene diisocyanate, fumaric acid, and polyoxyethylene(2)p,p'-isopropylidenediphenol and having an average of four isocyanate groups per molecule, is mixed with 0.1 gram of diethylcyclohexylamine and 0.2 gram of 4,5-nonanedione, and the resulting mixture is poured into a mold. No external heat is applied to the mold. After a brief initiation period, a rapid trimerization of the isocyanate occurs to form a hard casting.

The following procedure is employed in Examples 22 to 24. 13.1 grams of chlorobenzene, 11.9 grams of phenylisocyanate, 0.119 gram of 1,4-diazabicyclo-(2,2,2)-octane, and 0.476 gram of 2,3-butanedione are added to a 50 ml. flask which is equipped with a recording thermocouple, insulated with glass wool, and provided with a stirrer. The stirrer is turned on, and the flask is heated to the indicated temperature.

| Example number | Temperature, °C. | Initiation period, minutes | Time to maximum temperature, minutes |
| --- | --- | --- | --- |
| 22 | 52 | 5.3 | 0.7 |
| 23 | 81 | 2.4 | 0.78 |
| 24 | 107 | 3.6 | 1.1 |

Although this invention has been described with reference to specific chemical materials, including specific isocyanates, tertiary amines, co-catalyst, and solvents, as well as specific amounts of these materials and specific method steps, it will be appreciated that numerous other chemical materials may frequently be substituted for those described and that the described amounts of these materials and described method steps may be modified, all within the spirit and the scope of this invention as defined in the appended claims.

Having described the invention, what is desired to be secured by Letters Patent is:

I claim:

1. A process of trimerizing aromatic isocyanates which comprises contacting an aromatic isocyanate with a catalyst composition comprising the combination of tertiary amine which exerts a catalytic effect on the trimerization of aromatic isocyanates and benzoyl peroxide.

2. A process of trimerizing aromatic isocyanates in accordance with claim 1 wherein the amount of catalyst composition used is from about 0.1 to about 10 percent by weight of aromatic isocyanate and wherein the catalyst composition comprises from about 10 to about 90 parts by weight of said tertiary amine and from about 90 to about 10 parts by weight of benzoyl peroxide.

3. A process of claim 2 wherein the tertiary amine is 1,4-diazabicyclo-(2,2,2)-octane.

4. A process of claim 2 wherein the aromatic isocyanate and catalyst composition are contacted in the presence of an organic solvent.

5. A process of trimerizing aromatic isocyanates in accordance with claim 1 wherein the tertiary amine is selected from the group consisting of pyridine, triethylamine, trimethylamine, tripropylamine, dimethyl aniline, hexahydrodimethyl aniline, triethylene tetramine, diethylcyclohexylamine, N,N-diethylethanolamine, and 1,4-diazabicyclo-(2,2,2)-octane.

6. A process of claim 1 wherein the aromatic isocyanate is a polyisocyanate.

7. A process of claim 6 wherein the aromatic isocyanate is selected from the group consisting of tolylene diisocyanate; p-phenylene diisocyanate; 1-methoxy-phenylene 2,4-diisocyanate; diphenylene 4,4-diisocyanate; toluene 2,4,6-triisocyanate; 1-ethylbenzene 2,4-diisocyanate; triphenylmethane 4,4',4''-triisocyanate; and diphenylmethane diisocyanate.

8. A process of claim 4 wherein the aromatic isocyanate is selected from the group consisting of tolylene diisocyanate, p-phenylene diisocyanate, 1-methoxy-phenylene 2,4-diisocyanate; diphenylene 4,4-diisocyanate, toluene 2,4,6-triisocyanate, 1-ethylbenzene 2,4-diisocyanate, triphenylmethane 4,4',4''-triisocyanate, and diphenylmethane diisocyanate, and wherein the tertiary amine is selected from the group consisting of pyridine, triethylamine, trimethylamine, tripropylamine, dimethyl aniline, hexahydrodimethyl aniline, triethylene tetramine, diethylcyclohexylamine, N,N-diethylethanolamine, and 1,4-diazabicyclo-(2,2,2)-octane.

9. A process of claim 8 wherein the aromatic isocyanate is tolylene diisocyanate and the tertiary amine is 1,4-diazabicyclo(2,2,2)-octane.

References Cited

UNITED STATES PATENTS

| | | | |
| --- | --- | --- | --- |
| 2,866,803 | 12/1958 | De Pree | 260—248 X |
| 3,179,626 | 4/1965 | Beitchman | 260—77.5 |
| 3,330,828 | 7/1967 | Grogler et al. | 260—248 |
| 3,578,662 | 5/1971 | Cornell | 260—248 |

JOHN M. FORD, Primary Examiner

U.S. Cl. X.R.

260—77.5 ISO